United States Patent
Ahn et al.

(10) Patent No.: US 9,983,017 B2
(45) Date of Patent: May 29, 2018

(54) ROUTE CALCULATING METHOD, ROUTE ACQUISITION METHOD OR TERMINAL FOR SAME

(71) Applicant: LG ELECTRONICS INC., Seoul (KR)

(72) Inventors: Hongbeom Ahn, Anyang-si (KR); Jaehyuk Choi, Anyang-si (KR)

(73) Assignee: LG Electronics Inc., Seoul (KR)

( * ) Notice: Subject to any disclaimer, the term of this patent is extended or adjusted under 35 U.S.C. 154(b) by 0 days. days.

(21) Appl. No.: 14/382,650

(22) PCT Filed: Apr. 5, 2013

(86) PCT No.: PCT/KR2013/002867
§ 371 (c)(1),
(2) Date: Sep. 3, 2014

(87) PCT Pub. No.: WO2013/151379
PCT Pub. Date: Oct. 10, 2013

(65) Prior Publication Data
US 2015/0039210 A1    Feb. 5, 2015

Related U.S. Application Data

(60) Provisional application No. 61/620,992, filed on Apr. 6, 2012, provisional application No. 61/623,577, filed (Continued)

(51) Int. Cl.
*G01C 21/34* (2006.01)
*G06Q 50/30* (2012.01)
(Continued)

(52) U.S. Cl.
CPC ......... *G01C 21/3492* (2013.01); *G06Q 50/30* (2013.01); *G08G 1/096827* (2013.01);
(Continued)

(58) Field of Classification Search
CPC .... G01C 21/00; G01C 21/34; G01C 21/3492; G01C 21/26; G01C 21/3415
(Continued)

(56) References Cited

U.S. PATENT DOCUMENTS 6,356,836 B1 * 3/2002 Adolph ............... G01C 21/26
701/410
6,622,087 B2 * 9/2003 Anderson .......... G01C 21/3484
701/533
(Continued)

FOREIGN PATENT DOCUMENTS

KR 10-2007-0061040 A 6/2007
KR 10-2007-0091469 A 9/2007
(Continued)

*Primary Examiner* — Mussa A Shaawat
*Assistant Examiner* — Abdhesh K Jha
(74) *Attorney, Agent, or Firm* — Birch, Stewart, Kolasch & Birch, LLP

(57) ABSTRACT

According to one embodiment of the present invention, a method is disclosed for calculating the route of a journey (trip) identified by an origin and a destination using traffic information on a terminal, wherein the method comprises the steps of: receiving updated traffic information relating to a first route, while the terminal or a moving object on which the terminal is mounted is running on the first route; calculating a second route by using the updated traffic information; and transmitting, to a server, an entire route or a partial route of the calculated second route. Here, the calculated second route is compared with the first route, information about a partial route comprising one or more changed segment sequences is transmitted to the server, the segment sequence comprises one or more continuous segments, and the information relating to the partial route can comprise first segment information and final segment information
(Continued)

about the segment sequence of the first route that will be substituted by respective segment sequences comprised in the partial route.

12 Claims, 11 Drawing Sheets

Related U.S. Application Data on Apr. 13, 2012, provisional application No. 61/668,455, filed on Jul. 6, 2012.

(51) Int. Cl.
    *G08G 1/0968*     (2006.01)
    *G09B 29/00*     (2006.01)

(52) U.S. Cl.
    CPC ..... *G08G 1/096844* (2013.01); *G09B 29/003* (2013.01); *G09B 29/006* (2013.01); *G09B 29/007* (2013.01)

(58) Field of Classification Search
    USPC ... 701/400, 23, 537, 1, 533, 2, 22, 29.1, 117
    See application file for complete search history.

(56) References Cited

U.S. PATENT DOCUMENTS

| | | | |
|---|---|---|---|
| 7,943,362 B2 | 5/2011 | Frost | |
| 2005/0222760 A1* | 10/2005 | Cabral | G01C 21/3492 701/423 |
| 2006/0100779 A1* | 5/2006 | Vergin | G01C 21/34 701/431 |
| 2007/0162222 A1 | 7/2007 | Endo et al. | |
| 2008/0275629 A1 | 11/2008 | Yun | |
| 2010/0057333 A1* | 3/2010 | Yun, II | G01C 21/3415 701/117 |
| 2013/0018574 A1* | 1/2013 | Adler | G01C 21/3492 701/408 |
| 2013/0204528 A1* | 8/2013 | Okude | G01C 21/3492 701/533 |

FOREIGN PATENT DOCUMENTS

| | | |
|---|---|---|
| KR | 10-2008-0012751 A | 2/2008 |
| KR | 10-2008-0097896 A | 11/2008 |

\* cited by examiner

ROUTE CALCULATING METHOD, ROUTE ACQUISITION METHOD OR TERMINAL FOR SAME

CROSS REFERENCE TO RELATED APPLICATIONS

This application is the National Phase of PCT International Application No. PCT/KR2013/002867, filed on Apr. 5, 2013, which claims priority under 35 U.S.C. 119(e) to U.S. Provisional Application Nos. 61/620,992 filed on Apr. 6, 2012, 61/623,577 filed on Apr. 13, 2012 and 61/668,455 filed on Jul. 6, 2012, all of which are hereby expressly incorporated by reference into the present application.

TECHNICAL FIELD

The present invention relates to a method for calculating a route in a terminal, a method for acquiring a route in a terminal, or a terminal for the same, and more particularly, to a method for calculating a route using information received from a server or a terminal for the same, and a method for acquiring a calculated route from a server or a terminal for the same.

BACKGROUND ART

Conventionally, a navigation terminal detects its current location, that is, an origin of a trip through a Global Positioning System (GPS) connection, receives information about a destination of the trip from a user, and internally calculates a route based on the origin and the destination. Along with the recent proliferation and increased performance of smartphones, services have become popular, in which a traffic and route information providing server provides route information, real-time traffic information related to routes, and other various information to Personal Navigation Devices (PNDs) over a mobile communication network.

Particularly in the situation where various navigation services are available, the Open Mobile Alliance (OMA) standardization organization is working on standardization of Dynamic Navigation Enabler (DynNav) that provides real-time traffic information by Peer to Peer (P2P) communication through an Internet Protocol (IP)-based network of a mobile communication network or a wireless network, rather than Traffic Protocol Expert Group (TPEG) information is transmitted over a Digital Multimedia Broadcasting (DMB) network that provides information in a broadcast signal. The standard considers a navigation terminal and a service type largely in two ways for a smartphone.

First, a traffic and route information providing server performs complex route computation, instead of a navigation application loaded in a smartphone, and indicates a calculated route to the smartphone. Second, owing to the improved performance of a smartphone, an application loaded in the smartphone performs or a navigation terminal equipped with a mobile communication modem performs route computation. In this case, the traffic and route information providing server does not provide route information. Rather, once the terminal registers a calculated route to the server, the terminal can receive from the server only real-time traffic information related to the registered route in a customized manner by IP-based P2P communication, not in a conventional broadcast signal.

FIG. 1 illustrates Navigation Device (ND) types. NDs may be classified into a type 110 that additionally provides TPEG-based traffic information transmitted through a broadcasting network such as a DMB network, a type 120 that additionally provides traffic information in an IP-based manner, for example, over a mobile communication network or a Wireless Fidelity (Wi-Fi) network, and a standalone type 130 that tracks the location of a vehicle through a GPS connection without connecting to other communication media, generates route information, and provides the route information.

DynNav under standardization in the OMA LOC WG belongs to the type 120 that provides IP-based traffic information, specifically by P2P communication. The following two types of NDs are defined in DynNav.

Smart ND: a device that can calculate a route on its own and thus requests only real-time traffic information to a DynNav server without receiving route information from the DynNav server.

Lightweight ND: a device that cannot calculate a route on its own and thus requests all real-time traffic information including route information to a DynNav server.

Since traffic information is requested and provided in a RESTful-based manner in a conventional DynNav system, the following route information formats are used and each information format can be defined by XML Schema Definition (XSD).

1) Trip Structure: a terminal initially acquires basic information such as an origin and a destination from a user, for route setting, and provides the acquired information to a server. The trip structure includes subsets corresponding to a plurality of route structures.

TABLE 1

| Element | Type | Optional | Description |
| --- | --- | --- | --- |
| originWGS84 | Location_Point | Yes | Location information about an origin represented by WGS84 (Location_Point structure is defined in tpeg-locML [TTI LOC]. At least one element originWGS84 or originAddress MUST be specified.) |
| originAddress | Civic Location Format | Yes | Location information about the origin represented as a civic location (Civic Location Format is defined by IETF [RFC 5139]. At least one element originWGS84 or originAddress MUST be specified.) |
| destinationWGS84 | Location_Point | Yes | Location information about a destination represented by WGS84 (Location Point structure is defined in tpeg-locML [TTI LOC]. At least one element destinationWGS84 or destinationAddress MUST be specified.) |

TABLE 1-continued

| Element | Type | Optional | Description |
| --- | --- | --- | --- |
| destinationAddress | Civic Address Format | Yes | Location information about the destination represented as a civic location (Civic Location Format is defined by IETF [RFC 5139]. At least one element destinationWGS84 or destinationAddress MUST be specified.) |
| waypoints | Location_Point [0 . . . unbounded] | Yes | Location information about a way point (represented by WGS84)(Location_Point structure is defined in tpeg-locML [TTI LOC].) |
| startingTime | xsd:dateTime | Yes | Starting time of navigation service (if a service starting time is specified, the trip is a planned trip. If a service starting time is not specified, a current time is the service starting time). (starting time of the planned trip. If not present, current time is assumed.) |
| tollRoad | xsd:boolean | Yes | It indicates whether passing through a toll road is allowed. (If true or not present, a toll road is allowed.) |
| vehicleType | Vehicle_Info | Yes | Information about a used vehicle (Vehicle_Info structure is defined in tpeg-rtmML [TTI RTM].) |
| calculateRoute | xsd:boolean | Yes | It indicates whether the server provides a calculated route. (If false or not present, the server should not propose routes.) |
| link | common:Link [0 . . . unbounded] | Yes | Lin information about routes defined in the trip. (Links to routes related to the trip. Attribute "rel" must be set to "Route".) |
| resourceURL | xsd:anyURI | Yes | Self-referring URL information (Self-referring URL. SHALL NOT be included in POST requests, MUST be included in responses to any HTTP method that returns an entity body, and in PUT requests.) |

2) Route Structure: a route structure is expressed as a plurality of segments as a way to represent total routes calculated using the trip structure.

TABLE 2

| Element | Type | Optional | Description |
| --- | --- | --- | --- |
| travellingTime | xsd:float | Yes | Total travelling time (in minutes) for the route |
| distance | xsd:float | Yes | Total distance (in Km) of the route |
| origin | Location_Point | No | Origin of the route (represented by WGS84) (Location_Point structure is defined in tpeg-locML [TTI LOC].) |
| segment | Segment [1 . . . unbounded] | No | Sequence of road segments that form the route |
| trafficEvents | CategorizedEvent ListReference [0 . . . unbounded] | Yes | Information about links accessing traffic information resources (List of traffic events as defined in tpeg-rtmML [TTI RTM], grouped into categories.) |
| link | common:Link | Yes | Reference to the route for which it is proposed as alternative. Attribute "rel" must be set to "Route". |
| resourceURL | xsd:anyURI | Yes | Self-referring URL. SHALL NOT be included in POST requests, MUST be included in responses to any HTTP method that returns an entity body, and in PUT requests.) |

3) Segment Structure: it is a structure that represents each segment. The segment structure may define a real-time traffic state corresponding to the segment as well as the length of the segment, in TPEG.

TABLE 3

| Element | Type | Optional | Description |
| --- | --- | --- | --- |
| endPoint | Location_Point | No | Location information about the end point of each segment (represented by WGS84)(Location_Point structure as defined in tpeg-locML [TTI LOC]. The starting point of the segment should be assumed equal to the ending point of the previous segment (or the trip origin for the first segment)) |

TABLE 3-continued

| Element | Type | Optional | Description |
|---|---|---|---|
| midwayPoint | Location_Point [0 . . . unbounded] | Yes | Location_Point structure as defined in tpeg-locML [TTI LOC]. |
| linkName | xsd:string | Yes | Name of the road that the segment belongs to |
| distance | xsd:float | Yes | Length of the segment in km |
| travellingTime | xsd:float | Yes | Estimated average time to cover the segment expressed in minutes. It includes regular travelling time and delay. |
| delay | xsd:float | Yes | Estimated delay along the segment expressed in minutes. |
| speed | xsd:float | Yes | Estimated average speed along the segment expressed in m/s. |
| performance | xsd:string | Yes | Information about traffic state (levels may be defined to indicate delay, congestion, and severe congestion). (Description of traffic conditions along the segment. This field should be encoded according to tpeg rtmML definition [TTI RTM].) |

FIG. 2 is a diagram illustrating a signal flow for an operation of a lightweight ND in a conventional DynNav system. Because the lightweight ND does not support route calculation in view of its capability, the lightweight ND should request route information to a server and receive the route information from the server. The lightweight ND has the following main functionality.

1. The lightweight ND transmits trip information to the server, for use in route calculation at the server.

2. The lightweight ND receives information about a set of routes (including a recommended route) calculated by the server from the server.

3. The lightweight ND subscribes to a notification service to receive real-time traffic information from the server.

The signal flow illustrated in FIG. 2 contains the followings, on the whole.

1. The user defines journey parameters, and the application sends the parameters to the server; the server calculates a set of proposed routes based on the received parameters with related traffic information. The server replies with the location of the created "trip" resource to the application.

a) The server may reply with a representation of created "trip" resource, which contains resources identifiers of the proposed routes. In this case, message 2 is no longer required.

2. The application uses the trip resource to access trip's information which contains resources identifiers of the proposed routes.

3. The application uses the Route Identifier to access information describing each single proposed route with links to traffic events and performance parameters.

4. The application accesses then to traffic events related to the route, using links to traffic event resources provided in the route structure.

5. The user selects a route among the set of routes for which he is interested in receiving updated performance parameters and traffic events, and alternative routes when available.

6. The application requests to the server to create a subscription to notification service for the trip and route(s). The application is notified by the server of the following events:

New performance parameters and changes in traffic events, notification resource will include links to already existing routes resources.

Proposal of alternative routes due to traffic problems along the proposed routes; the notification resource will include the link to trip resource.

7. Traffic events and/or changes of performance parameters occur on the subscribed route(s): a notification resource is created.

8. The server delivers the notification resources to the application with links to modified resources, including the trip and the route with the updated traffic information (traffic events and performance parameters).

9. The application accesses the updated resources. The resources should be reflected in appropriate way.

10. The application request to modify the subscription setting adding notification for the new route. Just in case, the updated resource is an alternative route in step 9.

FIG. 3 is a diagram illustrating a signal flow for an operation of a smart ND in the conventional DynNav system. Because the smart ND supports route calculation in view of its capability, the smart ND calculates a route on its own based on trip information defined by a user and transmits information about the calculated route to a server. The smart ND has the following main functionality.

1. The smart ND calculates a route based on trip information.

2. The smart ND transmits information about the calculated route to the server and the server notifies the smart ND of a real-time traffic state.

3. The smart ND subscribes to a notification service based on the transmitted route information in order to receive real-time traffic information from the server.

The signal flow illustrated in FIG. 3 contains the followings on the whole.

1. The user defines journey parameters and the application sends parameters to the server. The server replies with the location of the created "trip" resources to the application.

a) The server may replay with a representation of created "trip" resource. In this use case behaviors are equivalent.

2. The application uploads the calculated route under the resource/{tripId}/routes. The server replies with a representation of the "route" resource, which contains performance parameters and links to traffic events.

a) The server may reply with the traffic information (performance parameters and traffic events). In this case an additional get operation is needed to retrieve content of resource.

3. The application subscribes to notification service for the trip and route.

4. Traffic events and/or changes of performance parameters occur on the subscribed route(s); a notification resource is created.

5. The server delivers the notification resource to the application with links to the modified resources, including the trip and the route with updated performance parameters and traffic information.

6. The application accesses to the updated resources and read the resources.

7. The application decides to calculate a new route with the received resources.

8. The application uploads the new calculated route under the resource/{tripId}/routes. The server replies with a representation of the "route" resources, which contains route performances and links to vents. This step may be repeated many times until a route that satisfies performance constrains is found.

9. The application requests to modify the subscription setting adding notification for the newly subscribed route.

The lightweight ND and smart ND of the conventional DynNav system described with reference to FIGS. 2 and 3 have several problems. Thereamong, in the present specification, the problems of the smart ND will be described.

A) Problems upon route retransmission

A smart ND calculates and transmits a first route to a server and subscribes to a notification service based on the route. Through this service, the smart ND may receive real-time traffic modification information of the route transmitted and managed by the server. If real-time traffic information is modified, the server delivers the information to a terminal via the notification service.

In the related art, the terminal receives the notification service, recalculates the route based on the modified route and transmits the whole route to the server based on the route recalculated by the terminal. At this time, the server checks the modified route and delivers real-time traffic information (generally including an estimated passage time of a segment) of the whole route as a response. After the terminal receives the response, if the calculated result is lower than previous route performance (route performance is changed according to implementation and service type), the smart ND recalculates another route and transmits the recalculated route to the server as a response. As a result, the above process is repeated in order to obtain a route with high route performance.

a) However, when this process is repeated, although the whole route may not actually be modified, the recalculated whole route should always be delivered from the terminal to the server. Transmitting the overlapping route data from the terminal to the server may cause unnecessary resource waste in both the terminal and the server. This will now be described in greater detail.

FIG. 4 shows operation of a smart ND according to the related art.

A terminal delivers navigation service request values (an origin, a destination, route type preference, etc.) of a user to a server to request current traffic information between the origin and the destination before route search (S401). The server receives the request of the terminal in S401 and provides traffic information, e.g., a traffic event and network performance parameters, based on the origin and the destination requested by the terminal. At this time, since a route is not accurately known, the server restrictively provides traffic information (S402). The terminal calculates a route based on the received traffic information and delivers and registers the route to and with the server in order to receive real-time traffic information (S403). The terminal starts a navigation service based on the traffic information (S405). If traffic flow of the route registered with the server (accidents or congestions on the route) is not changed, the traffic flow of the registered route is checked while step S405 is repeatedly performed. When change in traffic flow of the registered route is detected, the following steps are performed.

The server recognizes change in traffic flow and describes the change (S406). Change in traffic flow (that is, the traffic event and/or network performance parameters) is individually defined as resources. If the server recognizes change in traffic flow, the server allocates resources for the traffic flow and notifies the terminal of the resources (S407). The terminal recalculates a route based on real-time traffic information (S408). The terminal delivers the researched (recalculated) route to the server (S409). Then, the terminal may receive the real-time traffic information corresponding to the researched route from the server (S404).

In operation related to FIG. 4, in delivery of the traffic information according to change in traffic flow, recalculation of the route based on the delivered traffic information and upload of the recalculated route via S406 to S409, if the route transmitted from the terminal to the server partially overlaps with an existing route, unnecessary data transmission/reception may be performed.

B) In addition, a process of searching for a new route having better performance (having a shorter route passage time) than an existing route is infinitely repeated. For example, if estimated passage times of routes newly calculated by the terminal are greater than the estimated passage time of the route already registered with the server, S408 and S409 of the above-described process may be continuously repeated. This stops the navigation service or reduces service quality or user experience index.

DISCLOSURE

Technical Problem

An object of the present invention devised to solve the problem lies in a method for solving problems occurring in the above-described conventional services, that is, inefficiency of route and real-time traffic information delivery.

Technical Solution

The object of the present invention can be achieved by providing a method for calculating a route of a trip identified by an origin and a destination using traffic information at a terminal including receiving updated traffic information related to a first route while the terminal or a vehicle having the terminal mounted therein moves on the first route, calculating a second route using the updated traffic information, and transmitting a whole route or partial route of the calculated second route to a server, wherein the transmitting includes comparing the calculated second route with the first route and transmitting information about a partial route composed of one or more modified segment sequences to the server, wherein the segment sequence is composed of one or more consecutive segments, and wherein the information about the partial route includes first segment information and second segment information of a segment sequence of the first route to be replaced by each segment sequence included in the partial route.

Additionally or alternatively, the information about the partial route may include information about the one or more modified segment sequences.

Additionally or alternatively, the method may include receiving, from the server, a performance parameter of the whole route or partial route of the second route, and the performance parameter may include at least one of a speed, delay and a travel time for a segment of road.

Additionally or alternatively, the information about the partial route may include an indicator indicating that the information is related to the partial route.

Additionally or alternatively, the method may further include receiving, from the server, information indicating that updated traffic information related to the first route is created.

Additionally or alternatively, the method may further include recalculating the second route using the updated traffic information if traffic flow of the calculated second route is worse than that of the first route.

Additionally or alternatively, the method may further include requesting traffic information for a specific area, in which recalculation is repeated, if recalculation is repeated a predetermined number of times (n).

In another aspect of the present invention, provided herein is a terminal configured to calculate a route of a trip identified by an origin and a destination using traffic information received from a server including a transceiver configured to communicate with the server and a processor configured to calculate the route via the traffic information received from the server, wherein the processor is configured to receive updated traffic information related to a first route while the terminal or a vehicle having the terminal mounted therein moves on the first route, calculate a second route using the updated traffic information and transmit a whole route or partial route of the calculated second route to the server, wherein the processor is further configured to compare the calculated second route with the first route and transmit information about a partial route composed of one or more modified segment sequences to the server, wherein the segment sequence is composed of one or more consecutive segments, and wherein the information about the partial route includes first segment information and second segment information of a segment sequence of the first route to be replaced by each segment sequence included in the partial route.

Additionally or alternatively, the information about the partial route may include information about the one or more modified segment sequences.

Additionally or alternatively, the processor may receive, from the server, a performance parameter of the whole route or partial route of the second route and the performance parameter may include at least one of a speed, delay and a travel time for a segment of road.

Additionally or alternatively, the information about the partial route may include an indicator indicating that the information is related to the partial route.

Additionally or alternatively, the processor may receive, from the server, information indicating that updated traffic information related to the first route is created.

Additionally or alternatively, the processor may recalculate the second route using the updated traffic information if traffic flow of the calculated second route is worse than that of the first route.

Additionally or alternatively, the processor may request traffic information for a specific area, in which recalculation is repeated, if recalculation is repeated a predetermined number of times (n).

It is to be understood that both the foregoing general description and the following detailed description are merely exemplary of the invention, and are intended to provide an overview or framework for understanding the nature and character of the invention as it is claimed.

Advantageous Effects

According to embodiments of the present invention, it is possible to reduce unnecessary data transmission and delivery which may occur between a navigation device (or an application program) and a server and to increase service quality and/or quality of experience of a user.

DESCRIPTION OF DRAWINGS

The accompanying drawings, which are included to provide a further understanding of the invention and are incorporated in and constitute a part of this application, illustrate embodiment(s) of the invention and together with the description serve to explain the principle of the invention. In the drawings.

BEST MODE

Figure 1:
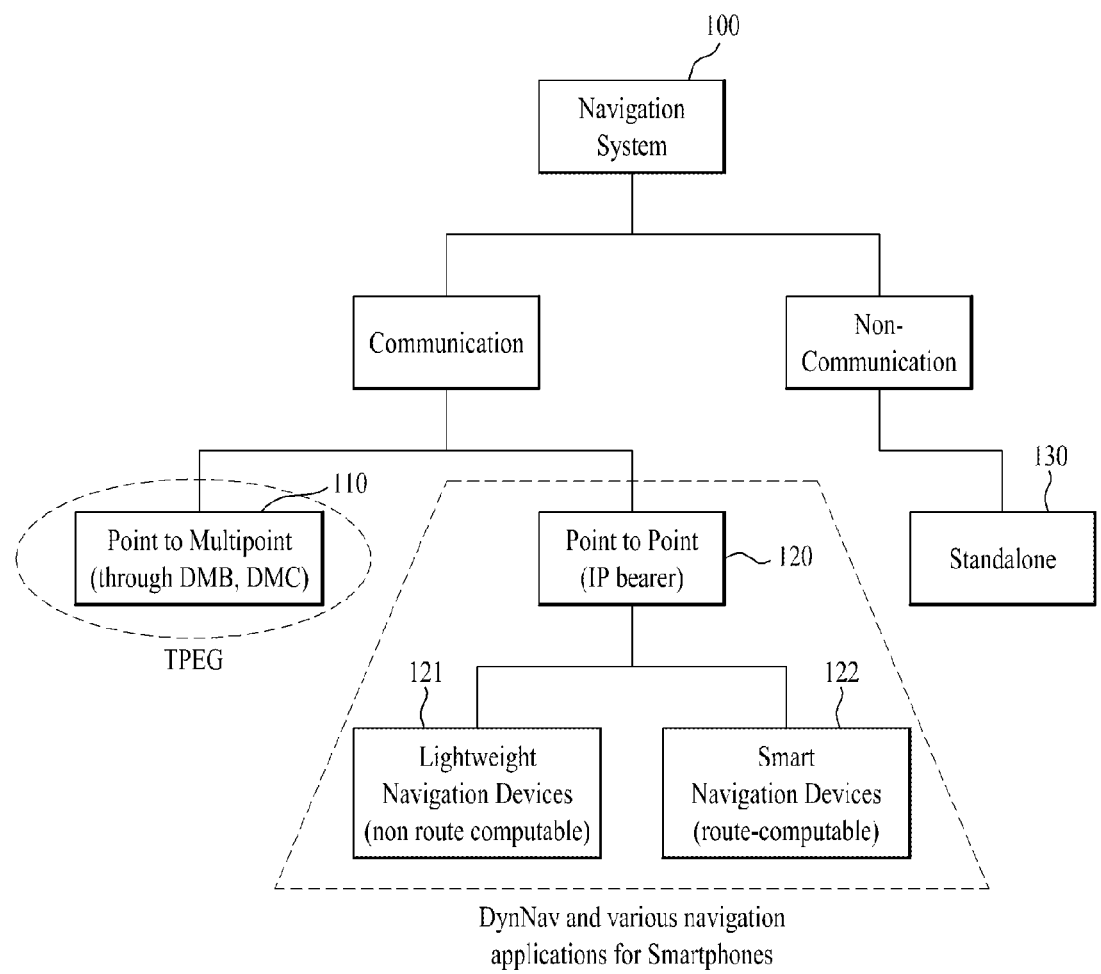
FIG. 1 is a diagram showing classification of a navigation device.
Figure 2:
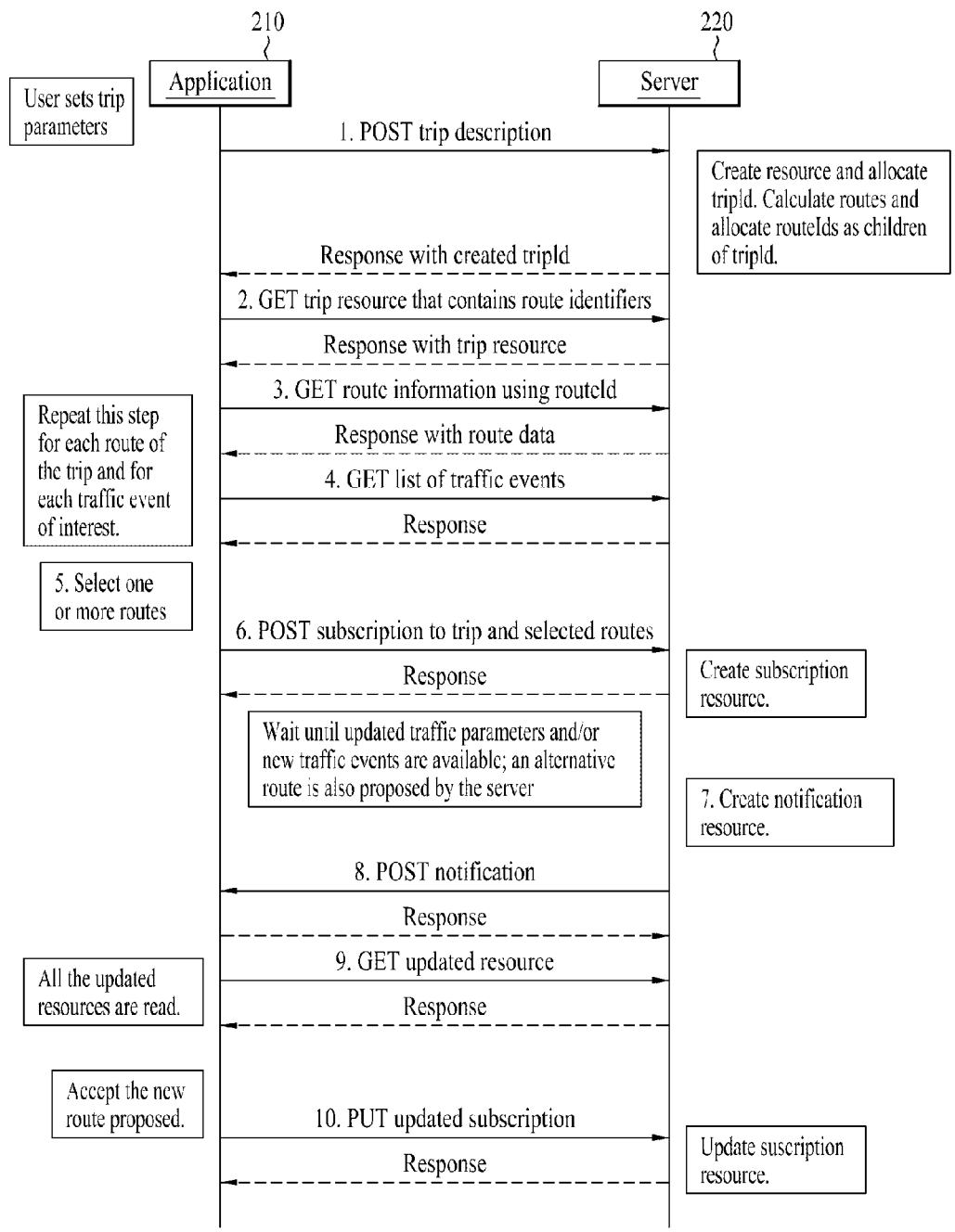
FIG. 2 is a flowchart showing operation of a lightweight ND in a conventional DynNav system.
Figure 3:
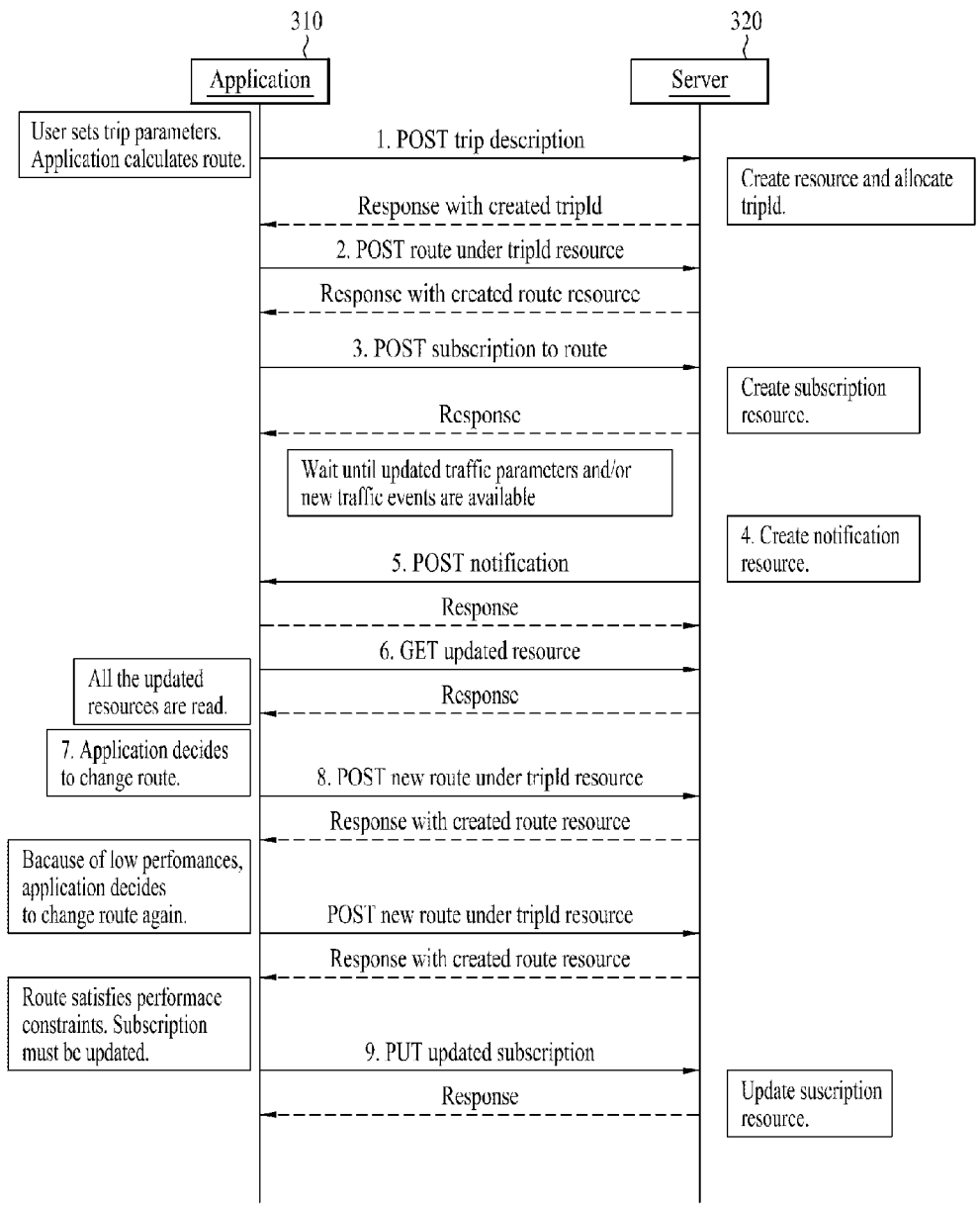
FIG. 3 is a flowchart showing operation of a smart ND in a conventional DynNav system.
Figure 4:
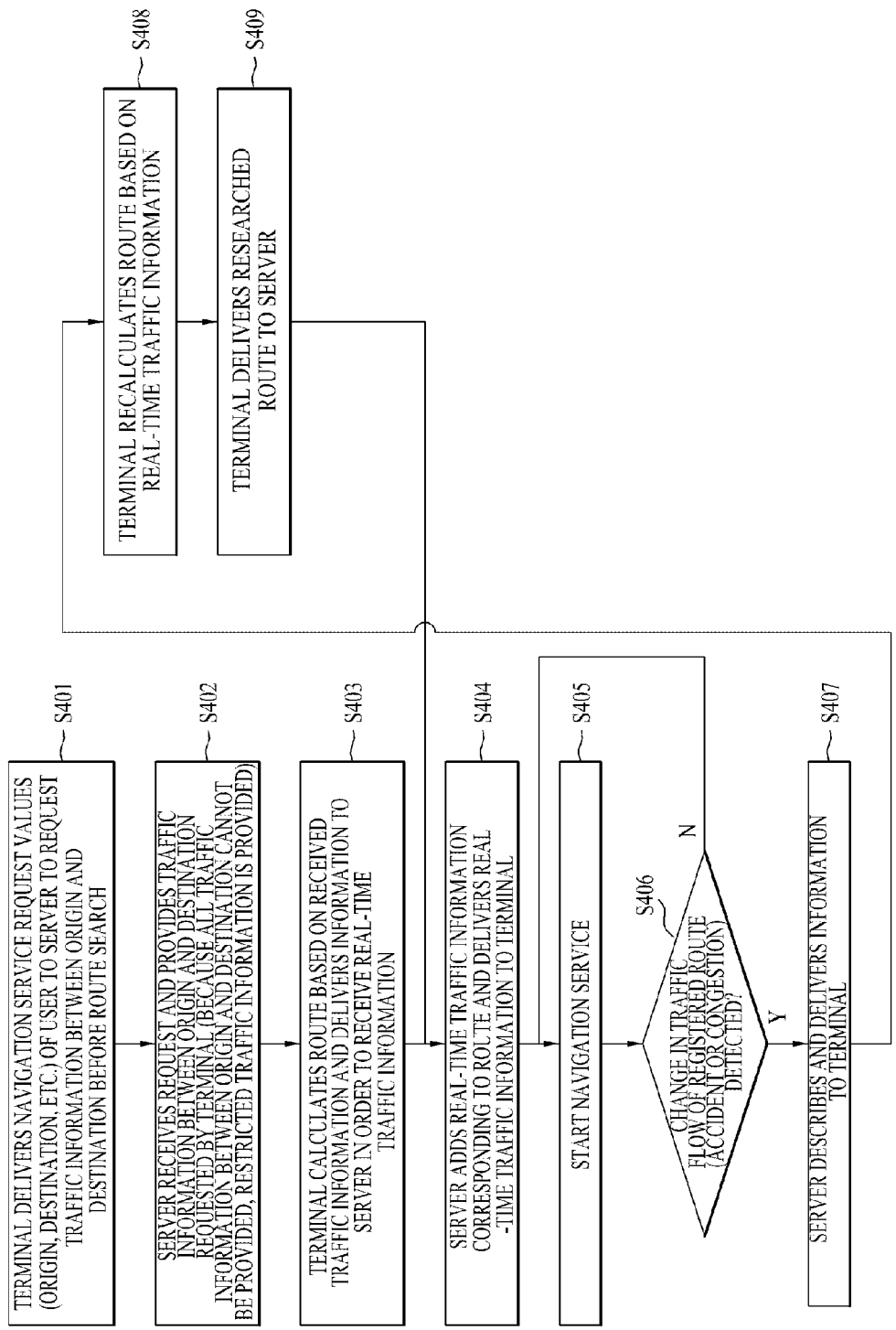
FIG. 4 is a diagram showing problems of the related art.

Reference will now be made in detail to the preferred embodiments of the present invention with reference to the accompanying drawings. The detailed description, which will be given below with reference to the accompanying drawings, is intended to explain exemplary embodiments of the present invention, rather than to show the only embodiments that can be implemented according to the invention. The following detailed description includes specific details in order to provide a thorough understanding of the present invention. However, it will be apparent to those skilled in the art that the present invention may be practiced without such specific details.

In some instances, known structures and devices are omitted or are shown in block diagram form, focusing on important features of the structures and devices, so as not to obscure the concept of the invention. The same reference numbers will be used throughout this specification to refer to the same or like parts.

Terms used herein will be defined as follows.

Application

An application is an implementation of a well-defined but not standardized set of functions that perform work on behalf of a user. The application may include software and/or hardware elements and associated user interfaces.

Server

In general, a server is an entity that provides resources to clients in response to requests in the technical field of the present invention.

Client

In general, a client is a device, user agent, or other entity that acts as a receiver of a service in the technical field of the present invention.

DynNav Application

A DynNav application is an entity that is in charge of interacting with a DynNav server to get optimal route(s), real-time and forecasted traffic information, and complementary data. Therefore, the DynNav application is loaded in a terminal such as a smartphone, a mobile phone, an ND, etc. Accordingly, the term DynNav application is interchangeably used with terminal. In this aspect, the DynNav application is a kind of client.

DynNav Server

A DynNav is an entity that is in charge of providing optimal route(s), real-time and forecasted traffic information, and complementary data to the application. In this aspect, the DynNav server is a kind of server.

Lightweight ND

A lightweight ND is a navigation device that does not have a route calculation function, requests a calculated route to a server, and receives information about the calculated route from the server. The lightweight ND accesses the server for route estimation functionalities and for retrieving roads shape representation, if not available in a local map database.

Location URI

A location Uniform Resource Identifier (URI) is a URI that enables the current location of a device to be obtained from a particular location server using a particular dereferencing protocol.

Navigation Device (ND)

An ND is an entity that assists a driver, showing a correct route using a Global Navigation Satellite System (GNSS) service to reach a final destination. This entity may process real-time and predicted traffic information and dynamically estimates the optimal route, according to user preferences.

Point of Interest (POI)

A POI describes information about locations such as name, category, unique identifier, or civic address.

Segment

A segment is a unit into which a road is divided. For a general road, a road running between intersections is a segment, whereas for a highway, a road is divided into segments according to a policy for the highway. Traffic congestion or a passing time may be determined on a segment basis. In the specification, the term segment is interchangeably used with a road section.

Segment Sequence

A set consisting of one or more consecutive segments. If necessary, the segment sequence consisting of one segment is available. Also, an end point of the first segment of the segment sequence consisting of two or more segments is equal to a start point of the second segment of the segment sequence.

Polyline

A polyline is a continuous line used in graphic computing composed of one or more line segments, defined by specifying the endpoints of each segment.

Route Information

Route information is information about segment end points and complementary data from a defined origin and a destination.

Smart ND

A smart ND is a navigation device that is able to calculate a route(s), using a road network database available on the device itself.

Traffic Information

Traffic information is information including traffic events and network performance parameters related to an area or a route. Further, the traffic information may include current or upcoming, that is, future traffic information.

Traffic Event

A traffic event is information about events related to an area or a route that are either imposed or planned by a road network operator (i.e., road works leading to lane closures) or events that occur outside the control of the road network operator (i.e., accidents).

Network Performance Parameter

A network performance parameter is information regarding the performance (i.e., speed, delay, and travel time) of road segments related to an area or a route).

Route Information in Full Format

Route information in a full format is a type of route information including information about all segments from a origin to a destination. Unless specified otherwise, route information is about a whole route.

Route Information in Summarized Format

Route information in a summarized format is a kind of route information including only information about segments selected for a summary of information from among all segments of a route between an origin and a destination (how segments are to be selected is beyond the scope of the present invention).

The present invention relates to a navigation system, method, and apparatus for reflecting real-time traffic information, and more particularly, to a navigation system, method, and apparatus for allowing a traffic information providing server to transmit real-time traffic information to an ND using a minimal communication bandwidth, when the ND is able to calculate a route on its own and has a modem connectable to a mobile communication network in a system for providing real-time traffic information. The present invention relates to a navigation system, method, and apparatus for allowing a traffic information providing server to transmit information about an optimal route and real-time traffic information to an ND even though the ND is not able to calculate a route on its own but is connectable to a mobile communication network. Along with the recent proliferation of smartphones, a navigation service of providing a travel route to a mobile communication terminal in a manner other than using a conventional Digital Multimedia Broadcasting (DMB) network is becoming popular. The OMA LOC WG calls this service Dynamic Navigation Enabler (DynNav).

In the specification, an ND refers to a device that can execute a route guidance function. The ND is any electronic device that can be carried, like a smartphone, a mobile phone, a mobile device, a laptop computer, a tablet PC, a smart pad, etc. or that can be attached to a portable object.

Figure 5:
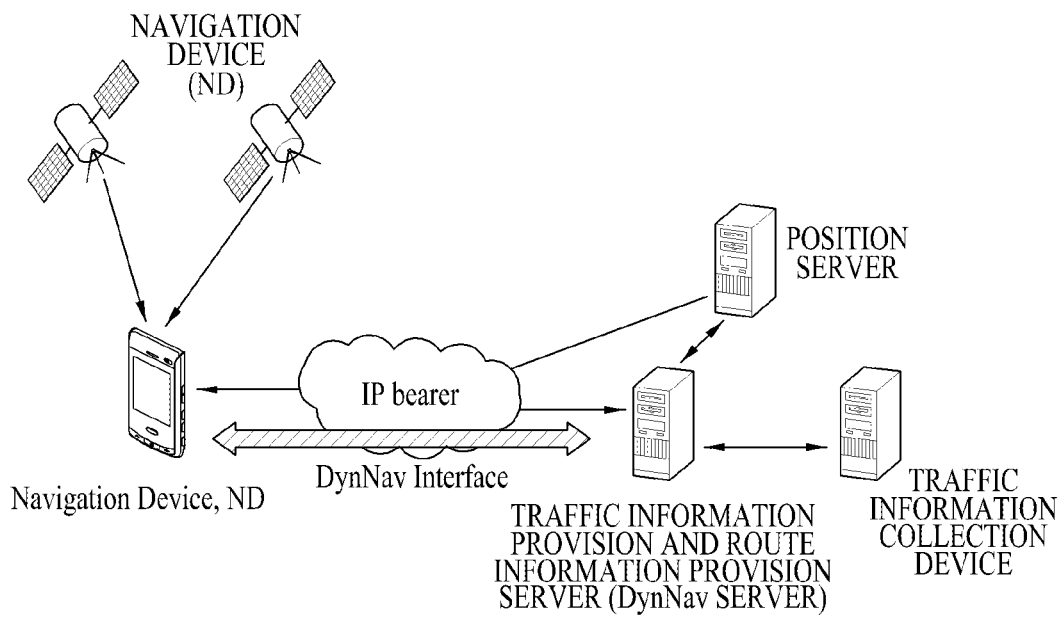
FIG. 5 is a diagram showing a network configuration illustrating an IP based DynNav system which is a navigation system of the present invention.

FIG. 5 illustrates a network configuration referred to for describing an Internet Protocol (IP)-based DynNav system being a navigation system according to the present invention. As illustrated in FIG. 5, the navigation system according to the present invention may include an ND that may be connected to a mobile communication network, a mobile communication network for wireless transmission and reception, a traffic information collector and a traffic information and route information providing server (i.e. a DynNav server), which provide traffic information, and a location server for generating and providing assistance data to locate an ND.

For simplicity of description, the traffic information and route information providing server or the DynNav server is referred to shortly as the "server". The navigation device is referred to shortly as the ND. According to the capability of an ND, the ND is referred to as the "smart ND" or "lightweight ND".

Figure 6:
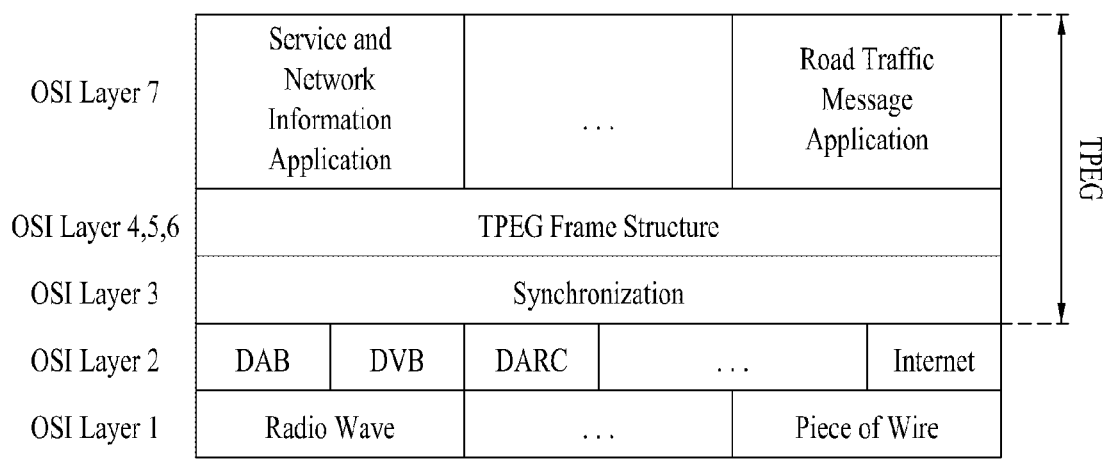
FIG. 6 is a diagram showing a hierarchical structure of a TPEG.

In the present invention, a terminal (two terminal types are available, as described before) may be connected to a mobile communication network or an IP network such as a Wireless Fidelity (Wi-Fi) network as illustrated in FIG. 6. A corresponding application may access the server, receive route guidance data and real-time traffic information, and thus provide route guidance. While not shown, a terminal capable of calculating a route on its own may selectively receive only real-time traffic information without receiving route guidance data from the server.

The real-time traffic information refers to optimal route information calculated and transmitted to the terminal by the server, real-time and forecasted traffic information, and additional information related to traffic, such as POI and weather. To avoid representational redundancy, a navigation application or a terminal is collectively referred to as a terminal. Accordingly, the terms "terminal", "smart ND", "lightweight ND", and "navigation application" may be referred to uniformly as "terminal".

The afore-mentioned real-time traffic information may be represented in Transport Protocol Experts Group (TPEG) under consideration in the ISO standardization organization. TPEG is a standard protocol used to transmit traffic information and travel information over a digital broadcasting network. As illustrated in FIG. 6, a TPEG layer stack corresponds to the network layer (Layer 3; L3) to application layer (Layer 7; L7) of the ISO/OSI layer model. The network layer defines TPEG frame synchronization and routing. The packetization layer of Layers 4, 5, 6 (L4, L5, and L6) combines components of applications into one stream. Each message format corresponds to the application layer, L7. In DynNav, real-time traffic information may be provided to a terminal in a real-time traffic information representation scheme of TPEG or any other representation scheme.

Figure 7:
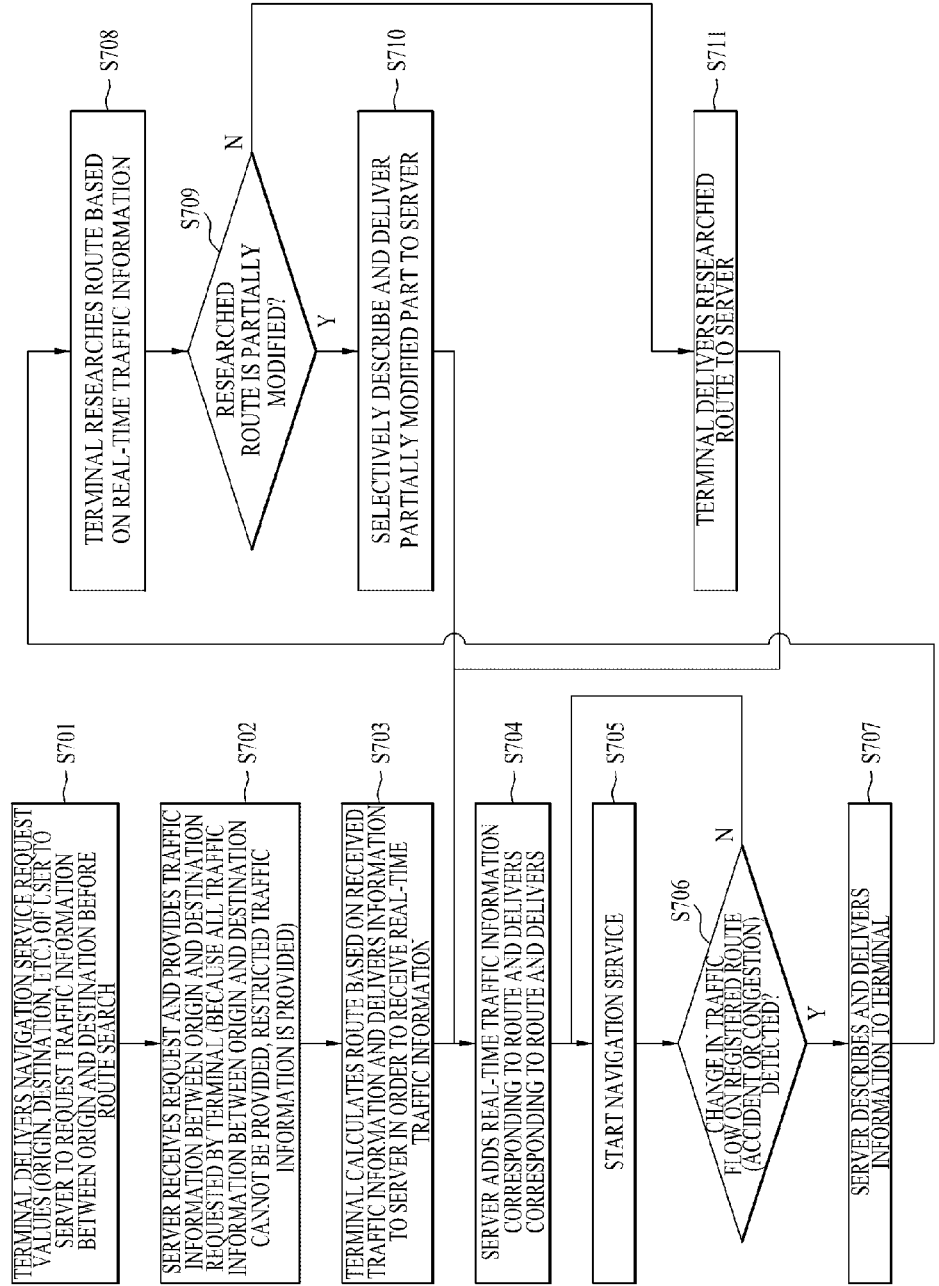
FIG. 7 is a flowchart of operation according to one embodiment of the present invention.

FIG. 7 is a flowchart of operation according to one embodiment of the present invention. A terminal of FIG. 7 is a smart ND. The smart ND may receive traffic information from a server before calculating a route. The terminal first acquires trip structure information such as an origin and a destination from a navigation user and transmits the trip structure information to the server to receive traffic information of a route before calculating the route. The flowchart of FIG. 7 will now be described in detail.

The terminal may deliver navigation request values necessary to start a navigation service of the user (an origin, a destination, etc.) to the server to request traffic information between the origin and the destination before route search or calculation (S701). The server may receive the request and provide restrictive traffic information between the origin and the destination requested by the terminal (S702). The traffic information includes the above-defined traffic events and (network) performance parameters and enables the smart ND to avoid a traffic congestion segment of road or a segment of road, in which an event causing traffic congestion, such as accidents or road constructions, occurs, upon route calculation. In addition, the traffic information may be referred to as traffic detour information in the present specification. For reference, since the performance parameters correspond to traffic flow information (e.g., an average speed and passage time of a segment of road, etc.) of all segments of road and the traffic events correspond to information on accidents occurring in a segment of road or events such as construction, the traffic events requires less data than the performance parameters.

The terminal may calculate a route (hereinafter, referred to as a "first route" or "reference route") based on the traffic information received from the server and then deliver information about the first route to the server in order to receive real-time traffic information (S703). The server may register the information about the first route and add and deliver the real-time traffic information of the first route to the terminal (S704). Through this process, the terminal can acquire a travel time from the origin (or the current point) to the destination of the first route.

The navigation service starts through the first route (S705). The navigation service starts through the route coincident with the route registered with the server.

When the server detects change in traffic flow of the registered first route, the following steps are performed and, otherwise, the navigation service is continuously performed.

The server may describe information about change in traffic flow of the first route, that is, traffic information, and deliver the information to the terminal (S707). The terminal may recalculate the route based on the real-time traffic information (S708). The terminal may determine whether the recalculated route (hereinafter, referred to as a "second route") is partially modified (S709). If the second route is partially modified, the process progresses to S710 and, otherwise, the process progresses to S711.

If the second route is partially modified from the first route, the terminal may deliver information about a modified part of the second route (hereinafter, referred to as a "partial route") to the server (S710). That is, the terminal may compare the first route with the second route and deliver only a part modified from the first route to the server. In the related art, the terminal transmits the whole newly calculated route (that is, the second route) to the server. However, this leads to unnecessary resource waste. According to one embodiment of the present invention, it is possible to improve resource efficiency by transmitting only the partial route of a new route to the server.

The method for representing information about the partial route will now be described in detail.

If the second route is not partially modified from the first route, the terminal may deliver the whole second route to the server (S711). That is, if the second route does not completely overlap the first route, the terminal may transmit the second route to the server without change.

Additionally, in the present invention, when the partial route and the reference route (the first route) coexist, if the reference route is no longer used (e.g., because the traffic condition of the reference route is bad), the terminal deletes the route, When the route except for the partial route is deleted, the reference route is deleted using the reference route corresponding to the partial route and a first segment, a last segment and the number of segments, all of which are information about the partial route, such that the traffic information is continuously tracked.

Figure 8:
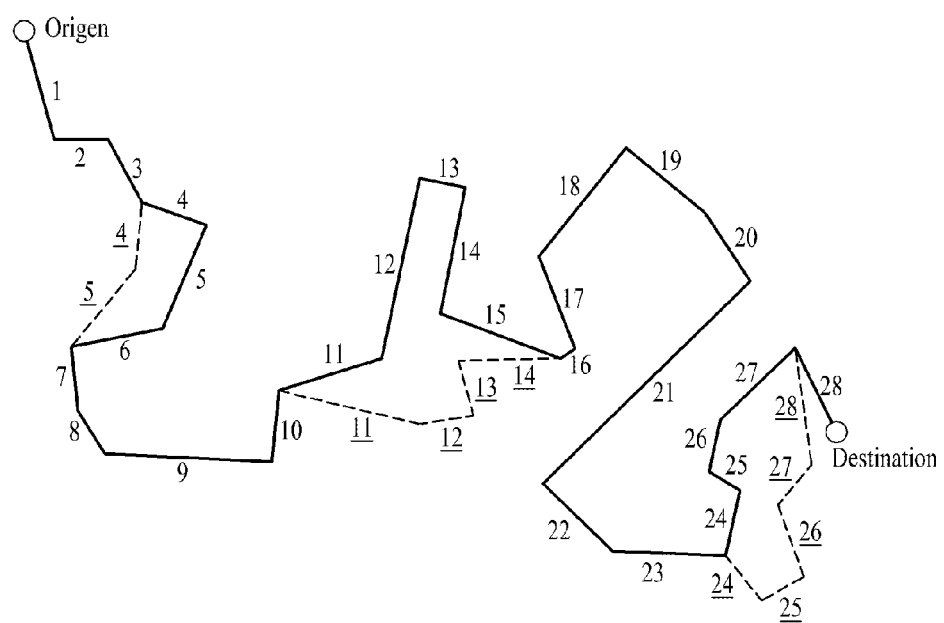
FIG. 8 is a diagram showing an example of the embodiment related to FIG. 7.

FIG. 8 is a diagram showing an example of the embodiment related to FIG. 7. In S710, the terminal may provide the partial route to the server instead of the whole route in a special case. A method for providing the partial route is referred to as a partial route encoding method in the present specification. The partial route encoding method may be used to efficiently access traffic information related to a set of routes sharing common segments.

As shown in FIG. 8, a solid line denotes a reference route (e.g., corresponding to the "first route" in the embodiment of FIG. 7) and a dotted line denotes a partially modified route (e.g., corresponding to the "second route" in the embodiment of FIG. 7). In the present specification, the partially modified route is referred to as a "partial route".

As route information, the terminal can choose to provide only a sequence of segments that is partially modified from the reference route previously uploaded to the server. In FIG. 8, the segments of the sequences 4 to 5, 11 to 13 and 24 to 28 denoted by the dotted line are partially modified from the reference route. The set of the consecutive segments of the sequences 4 to 5, 11 to 14 and 24 to 28 are respectively referred to as first to third segment sequences and the partial route composed of the first to third segment sequences may be transmitted to the server. These segment sequences may be included in a partial route description and the partial route description may be defined in a route structure. In this case, information about the partial route for merging the partial route with the reference route is provided as follows.

First segment—Indicates index information indicating a first segment of the segment sequence of the reference route to be replaced by the segment sequence of the partial route, with respect to each segment sequence of the partial route (4, 11 and 24 in the embodiment of FIG. 8).

Last segment—Indicates index information indicating a last segment of the segment sequence of the reference route to be replaced by the segment sequence of the partial route, with respect to each segment sequence of the partial route (6, 15 and 27 in the embodiment of FIG. 8).

Number of segments—Indicates information about the number of segments configuring each segment sequence (2, 4 and 5 in the embodiment of FIG. 8).

The information about the first segment, the last segment and the number of segments may be included in the route structure or the segment structure corresponding to Table 2 or Table 3. Since the information about the first segment, the last segment and the number of segments is related to the partial route, if the above-described information is included, an indicator indicating that the information about the segment is related to the "partial route" may be included in the route structure or the segment structure.

Figure 9:
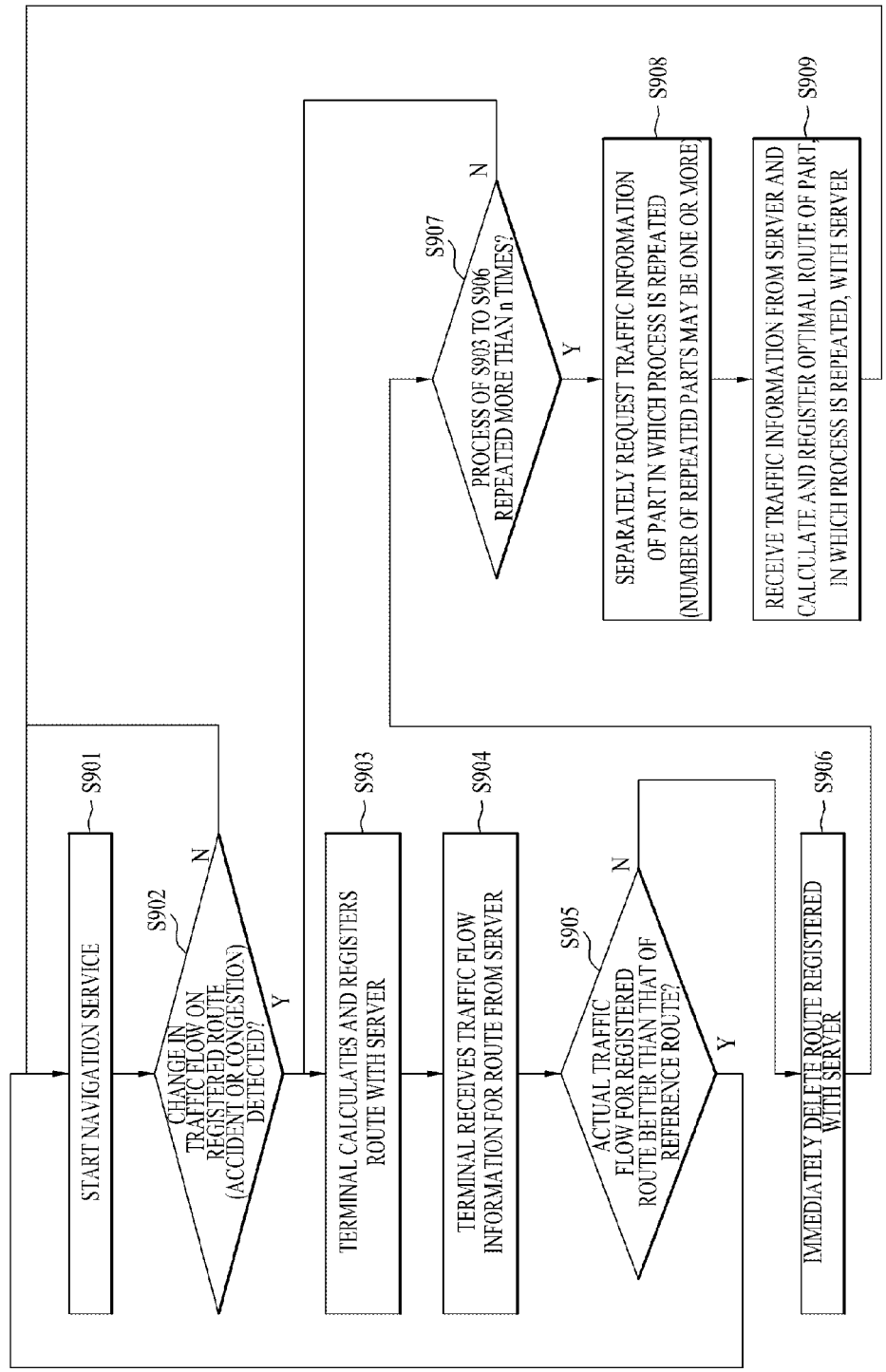
FIG. 9 is a flowchart of operation according to one embodiment of the present invention.

FIG. 9 is a flowchart of operation according to one embodiment of the present invention. An environment to which the embodiment of FIG. 9 applies is equal to that of FIG. 7 and FIG. 9 partially overlaps FIG. 7.

A navigation service starts via a first route (S901). The navigation service starts through a route coincident with a route registered with the server.

If the server detects change in traffic flow of the registered first route, the following steps are performed and, otherwise, the navigation service may be continuously provided (S902).

The server may describe information about change in traffic flow, that is, traffic information, to the terminal. The terminal may calculate the route based on real-time traffic information and register the recalculated route (hereinafter, referred to as a "second route") with the server (S903). When the second route is delivered, the terminal may use the partial route encoding method. Refer to the description of FIGS. 7 to 8.

The server may transmit the traffic information of the route registered in S903 to the terminal (S904). The terminal may determine whether the traffic flow of the registered route is better than that of the reference route (S905). If the traffic flow of the registered route is better than that of the reference route, the terminal may continuously perform the navigation service. However, if the traffic flow of the registered route is worse than that of the reference route, the following steps are performed. For example, the traffic flow may be determined based on a travel time from an origin (or a current point) to a destination via one route.

The terminal may delete the route registered with the server (S906). The server needs not manage the route which is not used by the terminal.

If the process of S903 to S906 is repeated (the process goes into a loop), the following steps are performed. The number of times of repetition may be restricted to an integer of 1 or more according to the embodiment of the present invention and the integer does not limit the range of the present invention.

The terminal may determine whether the process of S903 to S906 is repeated n times or more (S907). For determination, the terminal may increase a counter value by 1 in S906 and compare the counter value with n. If the process of S903 to S906 is repeated, the number of times of repetition may be restricted in S907 to prevent the embodiment of the present invention from going to an infinite loop. The terminal separately requests traffic information of a part, in which the process of S903 to S906 is repeated (S908). The repeated part may be represented by a segment sequence and the number of repeated parts may be one or more.

The terminal may receive traffic information of the repeated part from the server and calculate and register an optimal route of the repeated part with the server (S909).

In the embodiment of FIG. 9, when the route is recalculated using the traffic information, if a route having a traffic flow state worse than an existing route is repeatedly acquired, the process of the embodiment may exit the loop.

Figure 10:
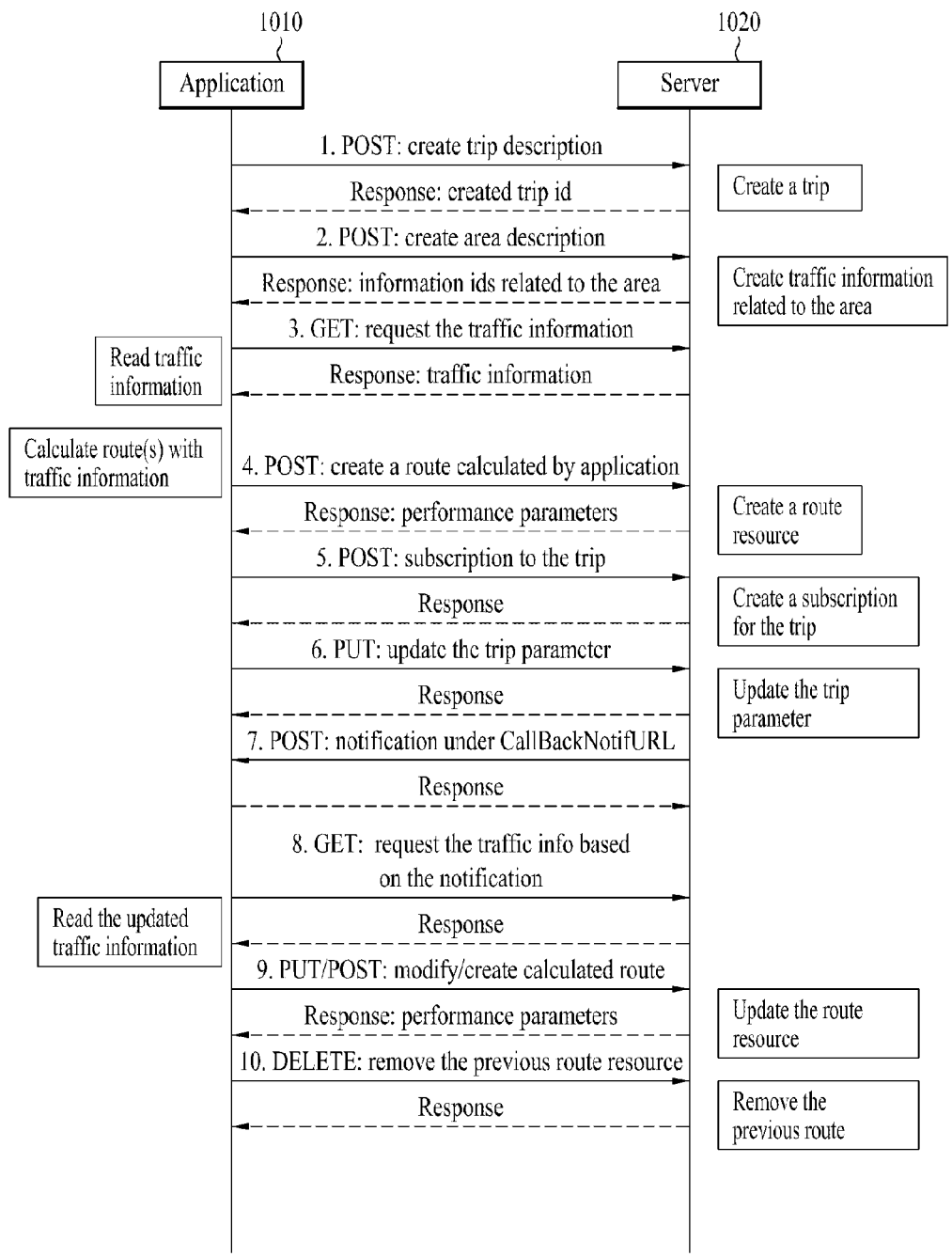
FIG. 10 is a diagram showing detailed operation according to one embodiment of the present invention.

FIG. 10 is a diagram showing detailed operation according to one embodiment of the present invention shown in FIGS. 7 to 9. An application 1010 corresponds to a DynNav application as described above and may be referred to as a "terminal". Accordingly, in the description of FIG. 10, the application is referred to as the "terminal". In addition, a server 1020 corresponds to a DynNav server as described above.

1. POST: Create Trip Description

The terminal 1010 may create a trip description via trip parameters defined by a user of the terminal, that is, an origin, a destination or other information, using a POST command. In response thereto, the server 1020 may create a trip corresponding to the trip description and transmit an identifier thereof and defined parameters to the terminal.

2. POST: Create Area Description

The terminal may create an area description using a POST command in order to request traffic information related to the trip identified by the origin and destination of the trip. For bandwidth and operation optimization, the server may provide two types of traffic information as a response.

a) performance parameters in the vicinity of the origin if severe congestion occurs in the vicinity of the origin; that is, in the present specification, the (network) performance parameter means information about performance or traffic flow (that is, speed, delay and travel time) of the segment indicating an area or route, the server transmits performance parameters of an area or on a route within a predetermined radius from the origin as a response in "2. POST: create area description", and these performance parameters may be provided by the server if a congestion having a predetermined level or more occurs in the area or on the route within the predetermined radius.

b) Traffic events of the area related to the trip.

3. GET: Request the Traffic Information

The terminal may read the traffic information provided by the server using a GET command. This traffic information may be used by the terminal to estimate or calculate the route of the above-defined trip while avoiding critical segments of road (influenced by accidents, construction or road congestions).

4. POST: Create a Route Calculated by Application

The terminal may upload the estimated route (selected from the routes calculated by the terminal) to the server using a POST command. The server may reply with a representation of "route" resource including the performance parameters and links to traffic events.

5. POST: Subscription to the Trip

The terminal may subscribe to the notification service for the area selected in step 2 and for the defined trip in step 3 using a POST command. The terminal will be notified of new information about performance parameters and traffic events related to the selected area and to all the routes uploaded for the trip.

6. PUT: Update the Trip Parameter

The terminal may periodically update the current position thereof using a PUT command in order to modify the origin parameter of the trip resource. This operation is triggered when the vehicle having the terminal mounted therein drives a certain distance from the previous reporting position, and the server may utilize this information to delete the already travelled segments from the route(s) information.

7. POST: Notification Under CallBackNotifURL

When traffic events and/or severe congestions along the proposed routes are detected by the server, the server notifies the terminal of the updated traffic information of the current route using a POST command on the address or URL (CallBackNotifURL) of the terminal.

8. GET: Request the Traffic Info Based on the Notification.

The terminal may access the updated traffic information (the traffic events and the performance parameters) related to the route using a GET command.

9. PUT/POST: Modify/Create Calculated Route

The terminal may decide to recalculate a new route under the following conditions.

a) The terminal receives the updated traffic information in step 8.

b) The terminal detects that the vehicle is deviating and diverting from the defined route.

The terminal may upload the newly calculated route to the server using a PUT command for an existing route or a POST command for a newly registered route, depending on whether or not the terminal wishes to maintain validity of the previous route. The server may reply with a representation of the "route" resource which contains performance parameters.

This step may be repeated several times until the performance of the recalculated route, that is travel time, is better than the previous routes. However, in order to avoid going into a loop, the terminal may define a new area description to acquire traffic information in an area where repetition occurs with operations similar to those described in steps 2 and 3.

For bandwidth optimization, the terminal can choose to use a partial route schema, uploading the changed segments with respect to an already defined reference route.

10. DELETE: Response the Previous Route Resource

The terminal may delete the previous routes no longer in use from the set of proposed routes using a DETETE command. The terminal may delete the newly calculated route from the set of proposed routes if the performance of the new route is worse than that of the previous route. The terminal may unsubscribe from the notification service for the previous routes using a DELETE command (if the new route has replaced the old route using a modify operation in step 9, the delete operation is not needed).

If the delete operation is executed on a route that is referenced in resources described with partial route information, the server has to keep the resources description consistent (that is, complete route description should be partially provided for route previously encoded).

Figure 11:
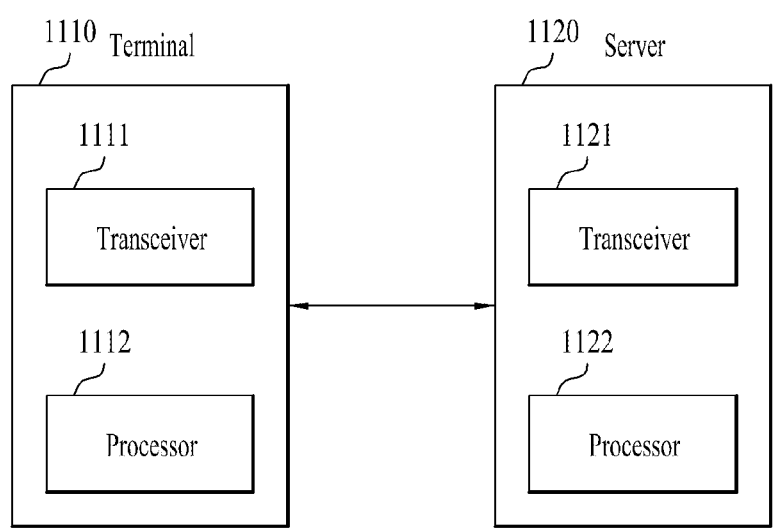
FIG. 11 is a block diagram showing a device in which the embodiments of the present invention may be implemented.

FIG. 11 is a block diagram showing a device in which the embodiments of the present invention may be implemented. The terminal 1110 may include a transceiver 1111 configured to communicate with the server 1120 and a processor 1112 configured to calculate the route via the traffic information received from the server. The server 1120 may include a transceiver 1121 configured to communicate with the terminal and a processor 1122 configured to calculate the route based on parameters related to a trip, such as an origin and a destination, which are received from the terminal, or collect and process the traffic information.

In the embodiment of the present invention described with reference to FIG. 11, the terminal 1110 is a smart ND. In this embodiment, the processor 1112 receives updated traffic information related to the first route while the terminal or a vehicle having the terminal mounted therein moves on the first route, calculates the second route using the updated traffic information and transmits the whole route or partial route of the calculated second route to the server.

The processor is configured to compare the calculated second route with the first route and to transmit information about the partial route composed of one or more modified segment sequences to the server. The segment sequence is composed of one or more consecutive segments and the information about the partial route may include first segment information and last segment information of the segment sequence of the first route to be replaced by each segment sequence included in the partial route.

The information about the partial route may include the one or more segment sequences.

In addition, the process is configured to receive the performance parameters of the whole or partial route of the second route from the server and the performance parameters may include at least one of a speed, delay and a travel time for a segment of road.

The information about the partial route may include an indicator indicating that the above information is related to the partial route.

The processor may be configured to receive, from the server, information indicating that the updated traffic information related to the first route has been created.

In addition, the processor may be configured to recalculate the second route using the updated traffic information if the traffic flow of the calculated second route is worse than that of the first route. If recalculation is performed a predetermined number of times (n), the processor may be configured to request the traffic information of a specific area in which recalculation is repeated.

The detailed description of the exemplary embodiments of the present invention has been given to enable those skilled in the art to implement and practice the invention. Although the invention has been described with reference to the exemplary embodiments, those skilled in the art will appreciate that various modifications and variations can be made in the present invention without departing from the spirit or scope of the invention described in the appended claims. Accordingly, the invention should not be limited to the specific embodiments described herein, but should be accorded the broadest scope consistent with the principles and novel features disclosed herein.

INDUSTRIAL APPLICABILITY

The embodiments of the present invention are applicable to a navigation device or server.

The invention claimed is:

1. A method for calculating a route of a trip identified by an origin and a destination using traffic information received from a server at a terminal, the method comprising:
   receiving, by the terminal from the server, updated traffic information related to a first route uploaded on the server from a server while the terminal or a vehicle having the terminal mounted therein moves on the first route;
   calculating, by the terminal, a second route using the updated traffic information;
   deriving, by the terminal, a partial route information of the calculated second route by comparing the calculated second route with the first route; and
   transmitting, by the terminal, the partial route information of the calculated second route to the server,
   wherein the partial route information includes an indicator indicating that the information about the calculated second route relates to a partial route of the calculated second route,
   wherein the partial route is composed of one or more segment sequences which are changed with respect to the first route,
   wherein each of the one or more changed segment sequences is composed of one or more consecutive segments,
   wherein the partial route information includes first segment information and last segment information of each segment sequence of the first route to be replaced by the one or more changed segment sequences included in the partial route,
   wherein the first segment information indicates index information indicating a first segment of the segment sequence of the first route to be replaced by the one or more changed segment sequences included in the partial route, and
   wherein the last segment information indicates index information indicating a last segment of the segment sequence of the first route to be replaced by the one or more changed segment sequences included in the partial route.

2. The method according to claim 1, wherein the partial route information includes information about the one or more changed segment sequences.

3. The method according to claim 1, further comprising:
   receiving, from the server, a performance parameter of a whole route or the partial route of the calculated second route,
   wherein the performance parameter includes at least one of a speed, a delay, and a travel time for a segment of a road.

4. The method according to claim 1, further comprising:
   receiving, from the server, information indicating that the updated traffic information related to the first route is created.

5. The method according to claim 1, further comprising:
   recalculating the second route using the updated traffic information if a traffic flow of the calculated second route is worse than a traffic flow of the first route.

6. The method according to claim 5, further comprising:
   requesting traffic information for a specific area, in which a recalculation is repeated, if the recalculation is repeated a predetermined number of times (n).

7. A terminal configured to calculate a route of a trip identified by an origin and a destination using traffic information received from a server, the terminal comprising:
   a transceiver configured to communicate with the server; and
   a processor configured to calculate the route using the traffic information received from the server,
   wherein the processor is configured to:
      receive, from the server, updated traffic information related to a first route uploaded on the server while the terminal or a vehicle having the terminal mounted therein moves on the first route,
      calculate a second route using the updated traffic information,
      derive a partial route information of the calculated second route by comparing the calculated second route with the first route, and
      transmit the partial route information of the calculated second route to the server,
   wherein the partial route information includes an indicator indicating that the information about the calculated second route relates to a partial route of the calculated second route,
   wherein the partial route is composed of one or more segment sequences which are changed with respect to the first route,
   wherein each of the one or more changed segment sequences is composed of one or more consecutive segments,
   wherein the partial route information includes first segment information and last segment information of each segment sequence of the first route to be replaced by the changed segment sequences included in the partial route,
   wherein the first segment information indicates index information indicating a first segment of the segment sequence of the first route to be replaced by the one or more changed segment sequences included in the partial route, and
   wherein the last segment information indicates index information indicating a last segment of the segment sequence of the first route to be replaced by the one or more changed segment sequences included in the partial route.

8. The terminal according to claim 7, wherein the partial route information includes information about the one or more changed segment sequences.

9. The terminal according to claim 7, wherein the processor receives, from the server, a performance parameter of a whole route or the partial route of the calculated second route and the performance parameter includes at least one of a speed, a delay, and a travel time for a segment of a road.

10. The terminal according to claim 7, wherein the processor receives, from the server, information indicating that the updated traffic information related to the first route is created.

11. The terminal according to claim 7, wherein the processor recalculates the second route using the updated traffic information if a traffic flow of the calculated second route is worse than a traffic flow of the first route.

12. The terminal according to claim 11, wherein the processor requests traffic information for a specific area, in which a recalculation is repeated, if the recalculation is repeated a predetermined number of times (n).

* * * * *